M. P. J. VAN GEERT.
SPRING SUSPENSION FOR ROAD VEHICLES.
APPLICATION FILED JULY 16, 1917.
1,281,233.
Patented Oct. 8, 1918.
2 SHEETS—SHEET 1.
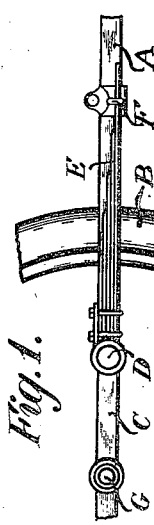
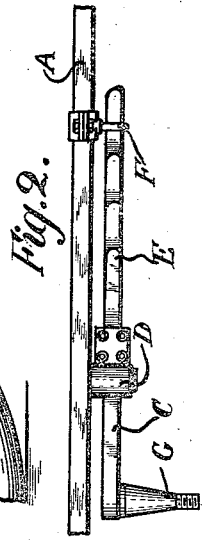
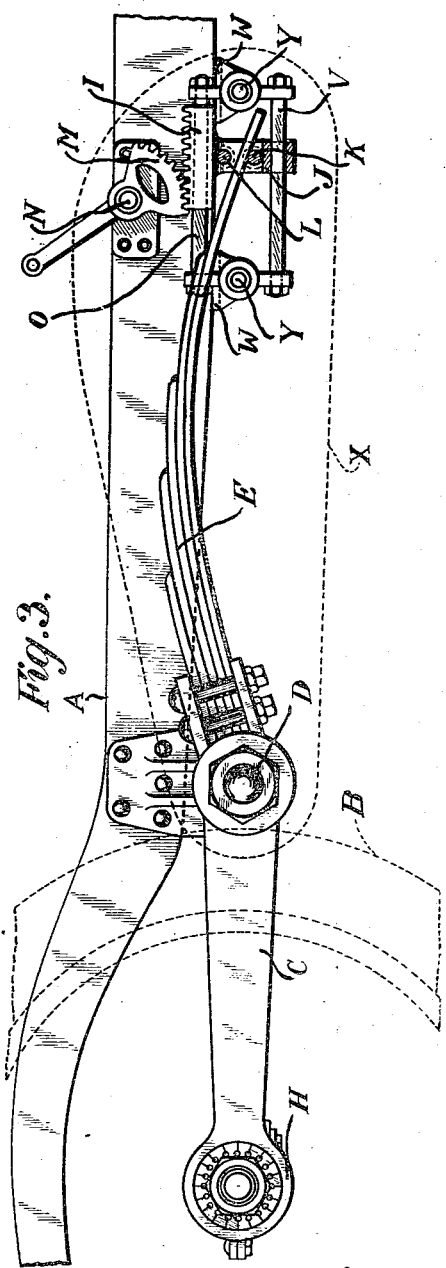
INVENTOR
Maurice P. J. Van Geert
By James L. Norris,
Attorney M. P. J. VAN GEERT.
SPRING SUSPENSION FOR ROAD VEHICLES.
APPLICATION FILED JULY 16, 1917.
1,281,233.
Patented Oct. 8, 1918.
2 SHEETS—SHEET 2.
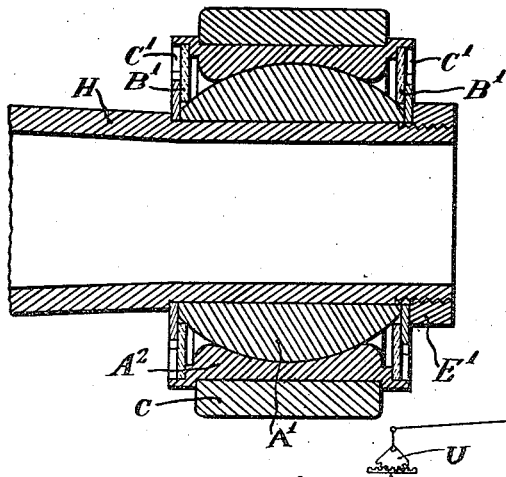
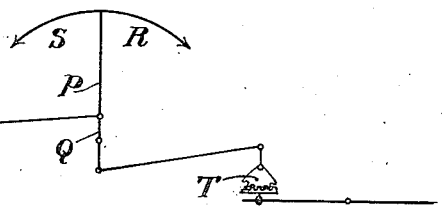
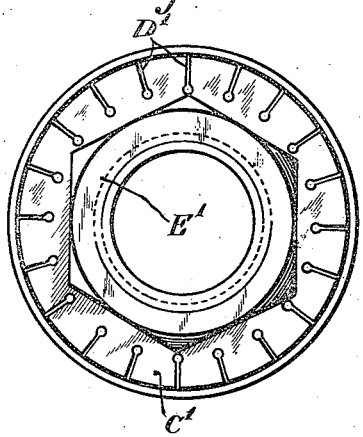
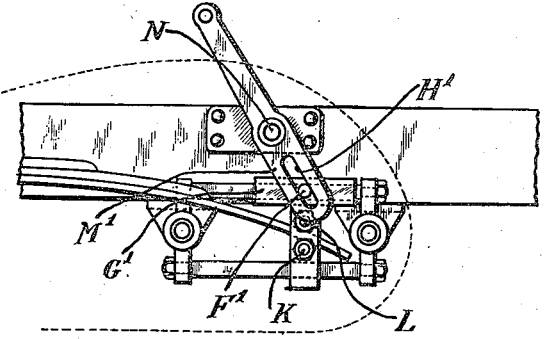
INVENTOR Maurice P. J. Van Geert
By James L. Norris
Attorney

UNITED STATES PATENT OFFICE.

MAURICE POLYDORE JACOB VAN GEERT, OF BIRMINGHAM, ENGLAND, ASSIGNOR OF ONE-HALF TO NICOLAS VAN HEEL, OF BIRMINGHAM, ENGLAND.

SPRING SUSPENSION FOR ROAD-VEHICLES.

1,281,233.   Specification of Letters Patent.   Patented Oct. 8, 1918.

Application filed July 16, 1917. Serial No. 180,890.

*To all whom it may concern:*

Be it known that I, MAURICE POLYDORE JACOB VAN GEERT, a subject of the King of Belgium, residing at 38 Alum Rock, Birmingham, England, have invented certain new and useful Improvements in Spring Suspensions for Road-Vehicles, of which the following is a specification.

This invention relates to spring suspension mechanism for road vehicles, and comprises a lever pivoted at a point between its ends to the vehicle frame and formed with one end or arm rigid to carry a road-wheel, and the other arm resilient to form a suspension spring suitably connected to the said frame to apply a downward thrust thereto. Preferably a sliding stop can constitute this connection and can be movable in the lengthwise direction of the spring for varying the effective resilience of the said spring. In the case of rear suspension of a motor vehicle the lever can serve as a radius rod, being adjustable in length in any known manner, and it can carry brake-mechanism.

The resilient arm can be constituted by a leaf-spring and it can be inclosed in a box or casing containing lubricant.

In the accompanying drawing:—

Figure 1 is a side view of part of a side-car chassis, and

Fig. 2 is a plan thereof.

Fig. 3 is a side view of part of a motor-car chassis;

Figs. 4 and 5 are respectively a section and an end view of a spherical bearing shown on an enlarged scale;

Fig. 6 is a diagram of a system of levers for varying the effective resilience of the spring, and Fig. 7 is a modified form of an adjusting device.

Referring to Figs. 1 and 2, A is the outer side member of a side-car chassis, and B is the side-car wheel. C is the rigid end of a lever pivoted at a point D between its ends to A, and E is a leaf spring forming the resilient end of the lever. The resilient end is preferably slidingly connected to A at F, and the wheel B is mounted on a spindle G carried by the rigid end of the lever. A second lever and spring can be disposed at the other side of the wheel if the latter is of the detachable and interchangeable type.

In Fig. 3, A is a side member of a motor-car chassis and B is a road-wheel. A lever with a rigid end C and a leaf spring forming a resilient end E is pivoted to the chassis at D, and an axle casing H of the car is carried by the rigid end of the lever. A similar lever is pivoted to the opposite side member of the chassis and the other end of the axle casing is carried by the rigid end of the said lever. In this construction the connection between the rigid end of the lever and one end of the axle casing is constituted by a bearing of spherical nature, although any other suitable connection may be used.

The arrangement of the spherical bearing is shown in detail in Figs. 4 and 5 in which H is the axle casing, C the lever, $A^1$ a spherical bush fixed to the axle casing, $A^2$ an interposed annular box or collar interiorly recessed to receive the spherical bush $A^1$, as shown, and also interiorly embraced by the rear end of the lever C, $B^1$ a dust-proof felt washer, $C^1$ a spring steel washer split at intervals at $D^1$, and $E^1$ a nut. The washers $B^1$ and $C^1$ are preferably seated in opposite sides of the box or collar $A^2$, as shown. The splits $D^1$ render the washer sufficiently resilient to allow the required freedom of movement for the bearing.

The resilient end E is connected to the chassis by a sliding connection comprising a toothed rack I carrying a depending lug J with stops K and L, located respectively below and above the leaf spring. K receives the normal downward thrust of the spring, and L engages the spring on the rebound.

A toothed sector M is adapted to be rocked on the spindle N so as to move the rack I with its lugs J along guide-rails O and V which are carried on brackets W bolted to the side-member A. This movement of the lug J adjusts the position of the stops K and L along the spring so as to vary the effective resilience of the latter. The brackets W can also be arranged to carry on spindles Y a casing X (shown in dotted lines) which incloses the spring, the other end of the casing being supported in any suitable manner. A similar construction can be used for the front wheels.

In Fig. 6, P is a lever located in a convenient position for operation by the driver. It is pivoted at Q so that when it is moved in the direction of the arrow R, the front wheel segment T and the rear wheel segment U are rocked on their respective racks so as to decrease the resilience of the springs. Conversely when the lever P is moved in the direction of the arrows S, the resilience of the springs is increased. It is also possible to connect the lever P to the sliding pieces without using the toothed sectors. For instance, there can be a direct connection with the sliding pieces. In another instance it is possible to make an arrangement as shown in Fig. 7 in which the lever M¹ replaces the toothed sector M shown in Fig. 3, and engages a pin F¹ on an adjustable sliding member G¹ which carries stops K and L for engaging the spring. The pin F¹ is adapted to slide in the slot H¹ as the lever M¹ is rocked on the spindle N.

Having fully described my invention, what I desire, claim and secure by Letters Patent is:—

1. In a spring suspension mechanism for road vehicles, a lever pivoted at a point between its ends to the vehicle frame and formed with one rigid extremity or arm to carry a road-wheel or axle, and the other extremity or arm free and resilient to form a suspension spring, and sliding means mounted on the frame and through which the free extremity or resilient arm has movement to increase and decrease the effective resilience of said latter arm.

2. In spring suspension mechanism for road vehicles, a lever pivoted at a point between its ends to the vehicle frame and formed with one rigid extremity or arm to carry a road-wheel or axle, and the other extremity or arm free and resilient to form a suspension spring, sliding means mounted on the frame and through which the free extremity or resilient arm has movement to increase and decrease the effective resilience of said latter arm, and means connected to said sliding means for shifting the latter in reverse directions on the frame.

3. In spring suspension mechanism for road vehicles, a lever pivoted at a point between its ends to the vehicle frame and formed with one rigid extremity or arm to carry a road-wheel or axle, and the other extremity or arm free and resilient to form a suspension, and a sliding device having upper and lower spaced restricting means between which the free resilient extremity or arm projects and has sliding movement.

4. In spring suspension mechanism for road vehicles, a lever pivoted at a point between its ends to the vehicle frame and formed with one rigid extremity or arm to carry a road-wheel or axle, and the other extremity or arm free and resilient to form a suspension, guide rails secured to the frame, a sliding member associated with said guide rails and provided with spaced stops between which the free resilient extremity or arm projects, and means for operating said sliding member.

In testimony whereof I have hereunto set my hand in presence of two subscribing witnesses.

MAURICE POLYDORE JACOB VAN GEERT.

Witnesses:
W. L. SKERRETT,
H. O. PRATT.